United States Patent Office 3,037,990
Patented June 5, 1962

3,037,990
PROCESS FOR PREPARING 5-PHENYL-2-DIALKYL-
AMINO-2-OXAZOLIN-4-ONES
Robert A. Hardy, Jr., Ridgewood, N.J., and Charles F.
Howell, New City, and Nicanor Q. Quinones, New
York, N.Y., assignors to American Cyanamid Company, New York, N.Y., a corporation of Maine
No Drawing. Filed Jan. 10, 1961, Ser. No. 81,697
3 Claims. (Cl. 260—307)

This invention relates to a novel process for preparing 5-phenyl-2-dialkylamino-2-oxazolin-4-ones which may be represented by the following general formula:

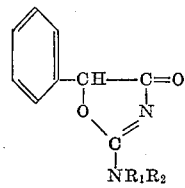

wherein $R_1$ and $R_2$ are the same or different lower alkyl radicals having from 1 to 4 carbon atoms.

These compounds are not claimed herein as they form the subject matter of our copending application Serial No. 35,115 filed June 10, 1960. The compounds therein described are highly useful central nervous system stimulants. They show a mild stimulant action and excellent anorexic action over a wide range of doses and possess distinct advantages over other stimulant drugs such as the amphetamines and pipradrol.

Amphetamine and closely related compounds such as methamphetamine have been used as central nervous system stimulants for many years, but numerous undesirable side reactions accompany their administration. For instance, they cause more or less pronounced rise in blood pressure and there is a tendency toward developing tolerance upon continual use. The new compounds do not have these serious side-effects and thus are markedly superior to the amphetamines. The new compounds also, even at high doses, are free of the undesirable adrenergic and cardiovascular actions characteristic of the amphetamines. As increasing doses of the amphetamines are given, convulsions are usually observed. The new compounds do not cause convulsions as the doses are increased. The new compounds possess a low order of toxicity and a desirably large spread between effective and lethal doses, i.e., a high therapeutic index. The new compounds have a much greater margin of safety than pipradrol which shows a rather narrow range between effective and toxic doses.

The new compounds may be used in the form of their free bases or as the non-toxic acid addition salts such as the hydrochloride, sulfate, phosphate, citrate, etc. The compounds may be administered orally or parenterally and when so administered are central nervous system stimulants at individual doses ranging from about 1 to 100 milligrams. The dosage regimen can be adjusted to provide the optimum therapeutic response. For example, several doses may be administered daily, or the dose may be proportionately reduced as indicated by the exigencies of the therapeutic situation.

The new process of this invention involves a base catalyzed condensation of a dialkylcyanamide with a lower alkyl ester of mandelic acid in an organic solvent and is illustrated schematically below:

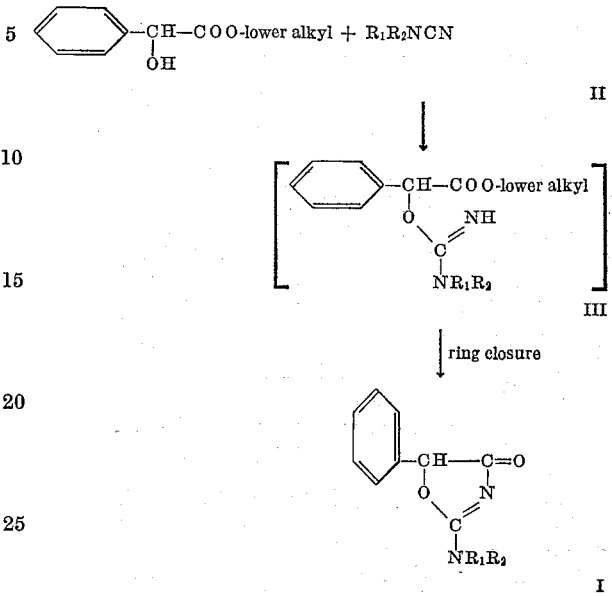

wherein $R_1$ and $R_2$ have the meaning hereinbefore given.

The reaction is generally carried out in a solvent such as benzene, toluene, xylene, a lower alkanol, tetrahydrofuran, bis(2-methoxyethyl)ether and the like. Equimolecular proportions of the lower alkyl mandelate ester and the dialkylcyanamide are generally used. Basic catalysts such as alkali metal and alkaline earth metal hydrides, lithium amides, lower alkoxides and the like are employed in the proportions from about 0.1 to about 1.0 molecular equivalents. Suitable catalysts in this reaction are sodium or potassium hydride, sodium or potassium methylate, magnesium hydride, potassium tert-butoxide, magnesium methylate, lithium amide, lithium diethylamide, calcium hydride, etc. The reaction may be carried out at temperatures of between about 20° C. and 175° C., with the preferred temperature being from about 80° C. to 150° C. The refluxing temperature of the solvent is conveniently used to bring about the reaction in a reasonable period of time, usually several hours. The open chain iso-urea structure (III) may be considered an intermediate in this reaction which loses a lower alkanol to give the desired products. However, isolation of such intermediates, formed in situ, is not necessary and is generally tedious and undesirable. A particular advantage of this invention is that it provides a simple and economically attractive route for the 5-phenyl-2-dialkylamino-2-oxazolin-4-ones from readily available starting materials.

The invention will be described in greater detail in conjunction with the following specific examples.

EXAMPLE 1

*Preparation of 2-Dimethylamino-5-Phenyl-2-Oxazolin-4-One*

A mixture of 0.37 g. of 54% sodium hydride in mineral oil and 9 g. of ethyl mandelate in 25 milliliters of benzene is warmed until evolution of hydrogen is complete and_

3.5 g. of dimethylcyanamide is then added. The mixture is heated at the refluxing temperature for about one hour and cooled. The benzene solution is washed with 25 milliliters of water and extracted with 25 milliliters of 10% aqueous hydrochloric acid solution. The acidic aqueous extract is separated and neutralized with solid potassium carbonate. 5 - phenyl - 2 - dimethylamino - 2 - oxazolin-4-one, melting point 132–135° C., is obtained when the precipitate is collected and dried; yield 6.2 g. (61% of theory).

Substantially similar results are obtained when calcium hydride or magnesium hydride are substituted for the sodium hydride used herein.

EXAMPLE 2

*Preparation of 2-Dimethylamino-5-Phenyl-2-Oxazolin-4-One*

The procedure of Example 1 is repeated reacting 383 g. of ethyl mandelate with 15.7 g. of sodium hydride and 149 g. of dimethylcyanamide. The reaction proceeds smoothly and the product obtained by neutralization with potassium carbonate is recrystallized from water. In this manner, 234 g. (54% of theory) of purified 2-dimethylamino-5-phenyl-2-oxazolin-4-one, melting point 133–136° C., is obtained.

EXAMPLE 3

*Preparation of 2-Diethylamino-5-Phenyl-2-Oxazolin-4-One*

To a mixture of 1.1 g. of 50% sodium hydride in 50 milliliters of anhydrous benzene is added gradually with stirring 9.0 g. of ethyl mandelate. When the evolution of hydrogen is complete, 5.0 g. of diethylcyanamide is added and the mixture is heated at the refluxing temperature and allowed to cool. Thirty milliliters of water is added, the benzene layer is separated and the solvent is evaporated. The oily residue is taken up in 125 milliliters of petroleum ether and the crude crystallizes on standing. It is collected and purified by dissolution in dilute aqueous hydrochloric acid followed by saturating the filtrate with potassium carbonate. The product reprecipitates as an oil which solidifies on standing and is collected and dried. Further purification by recrystallization from ether by the addition of petroleum ether gives 2-diethylamino-5-phenyl-2-oxazolin-4-one, melting point 75–77° C.

EXAMPLE 4

*Preparation of 2-Dimethylamino-5-Phenyl-2-Oxazolin-4-One*

To a solution of 0.5 g. of sodium methoxide in 25 milliliters of absolute methanol is added 9 g. of ethyl mandelate followed by 3.5 g. of dimethylcyanamide. The mixture is heated at the refluxing temperature for about 1 hour and the solvent is evaporated. The residue is dissolved in 25 milliliters of methylene chloride and washed with an equal volume of water. The organic layer is diluted with several volumes of ether whereupon 2-dimethylamino-5-phenyl-2-oxazolin-4-one precipitates and is collected. The filtrate is evaporated to dryness, the residue is dissolved in ether and the mixture is extracted with 20 milliliters of 10% aqueous hydrochloric acid. Neutralization of the aqueous extract with potassium carbonate gives an additional amount of the desired product. After cooling the mixture it is collected. If desired, the product is purified by recrystallization from water or ethyl acetate.

We claim:

1. A process for preparing 5-phenyl-2-dialkylamino-2-oxazolin-4-ones of the formula:

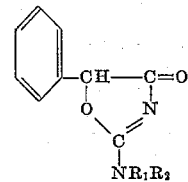

wherein $R_1$ and $R_2$ are lower alkyl which comprises reacting a lower alkyl ester of mandelic acid with a di-loweralkylcyanamide of the formula:

$$R_1R_2NCN$$

wherein $R_1$ and $R_2$ are lower alkyl in the presence of a basic catalyst selected from the group consisting of alkali metal and alkaline earth metal hydrides, amides and lower alkoxides at a temperature between 20° C. and 175° C. in a non-reactive organic solvent.

2. A process according to claim 1 in which the catalyst is sodium hydride.

3. A process according to claim 1 in which the catalyst is sodium methoxide.

No references cited.